Nov. 5, 1957 — R. W. WILSON — 2,811,803
FISH SNARE
Filed Sept. 19, 1955 — 3 Sheets-Sheet 3
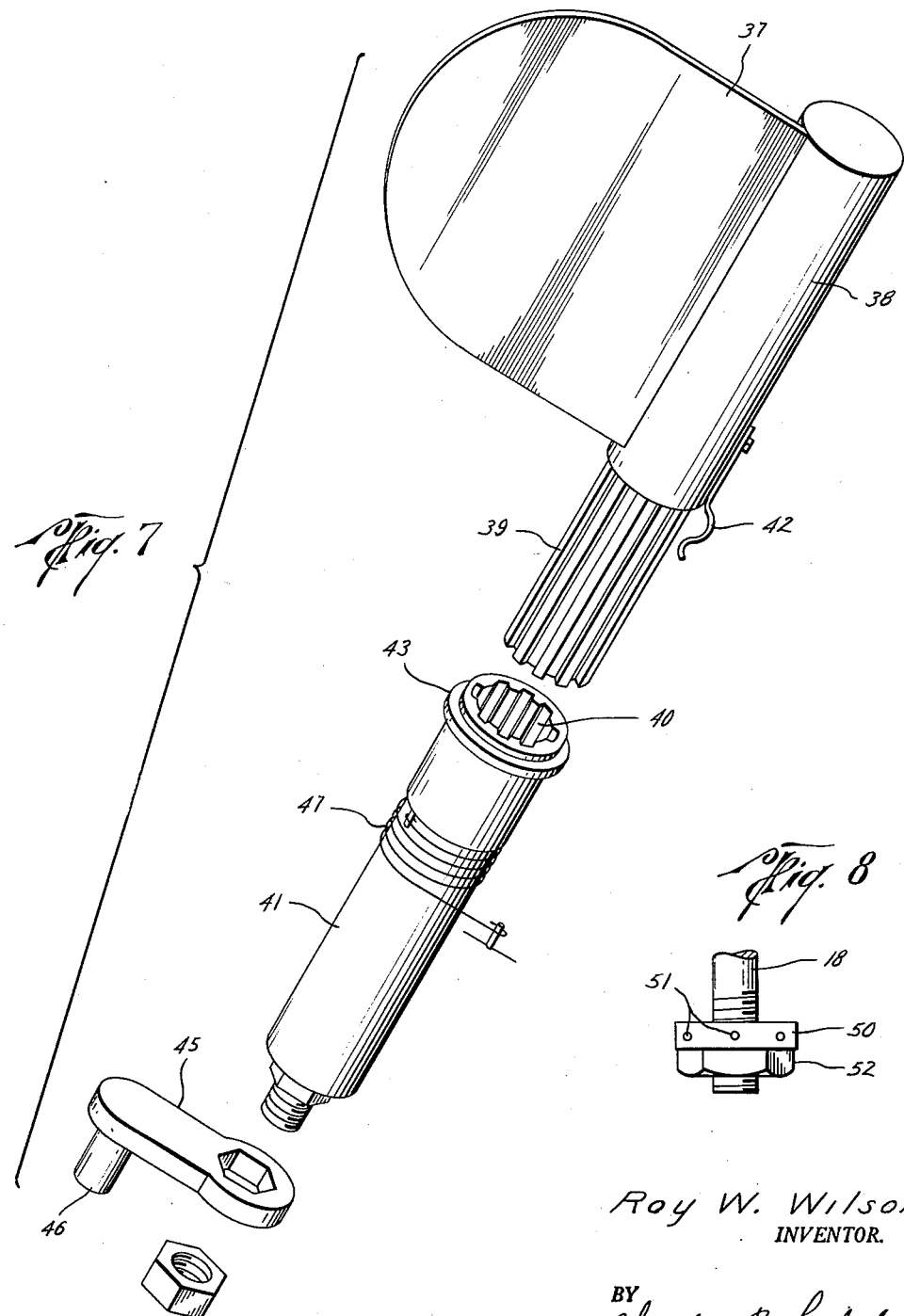
Roy W. Wilson
INVENTOR.
BY Charles E. Lightfoot
ATTORNEY

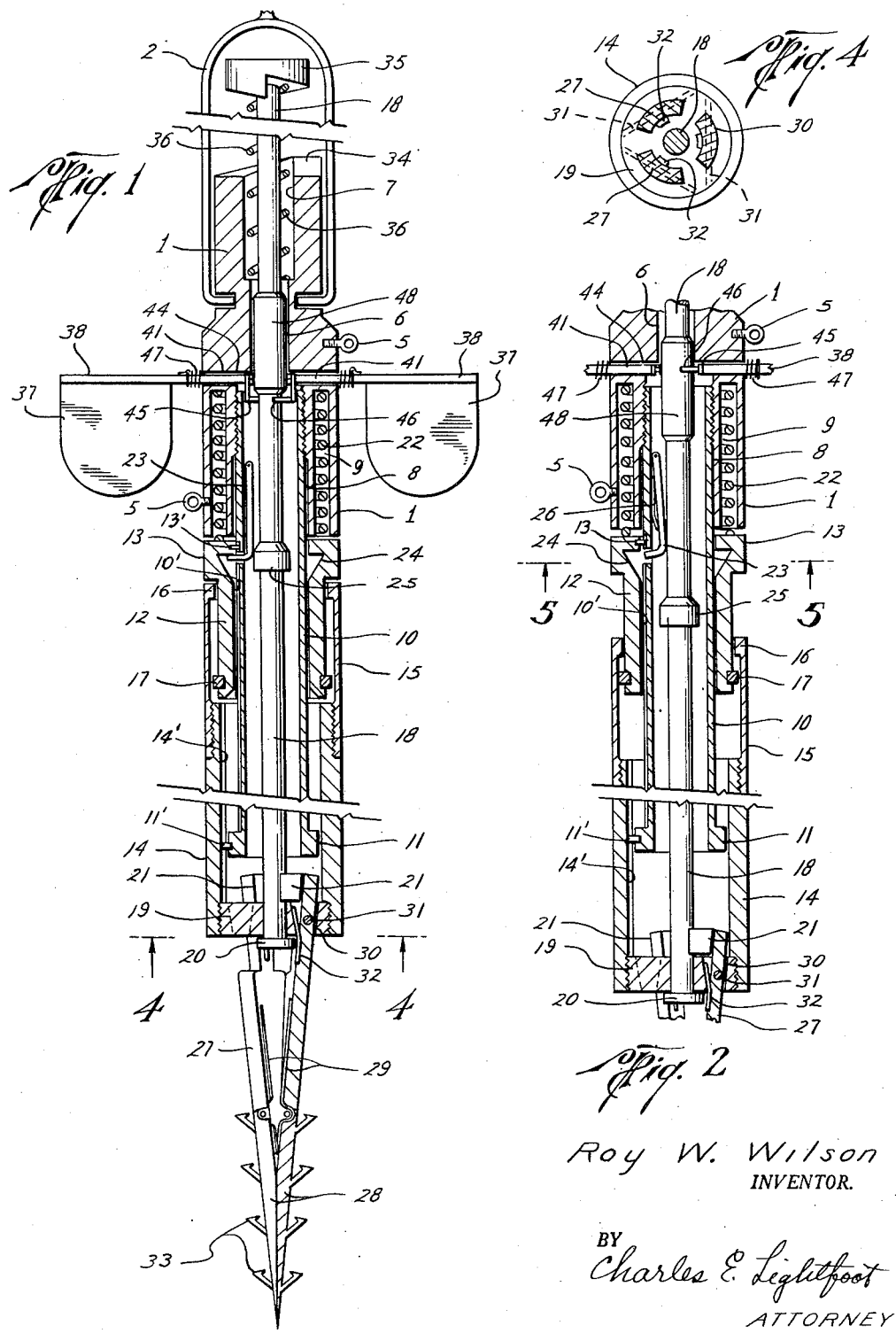

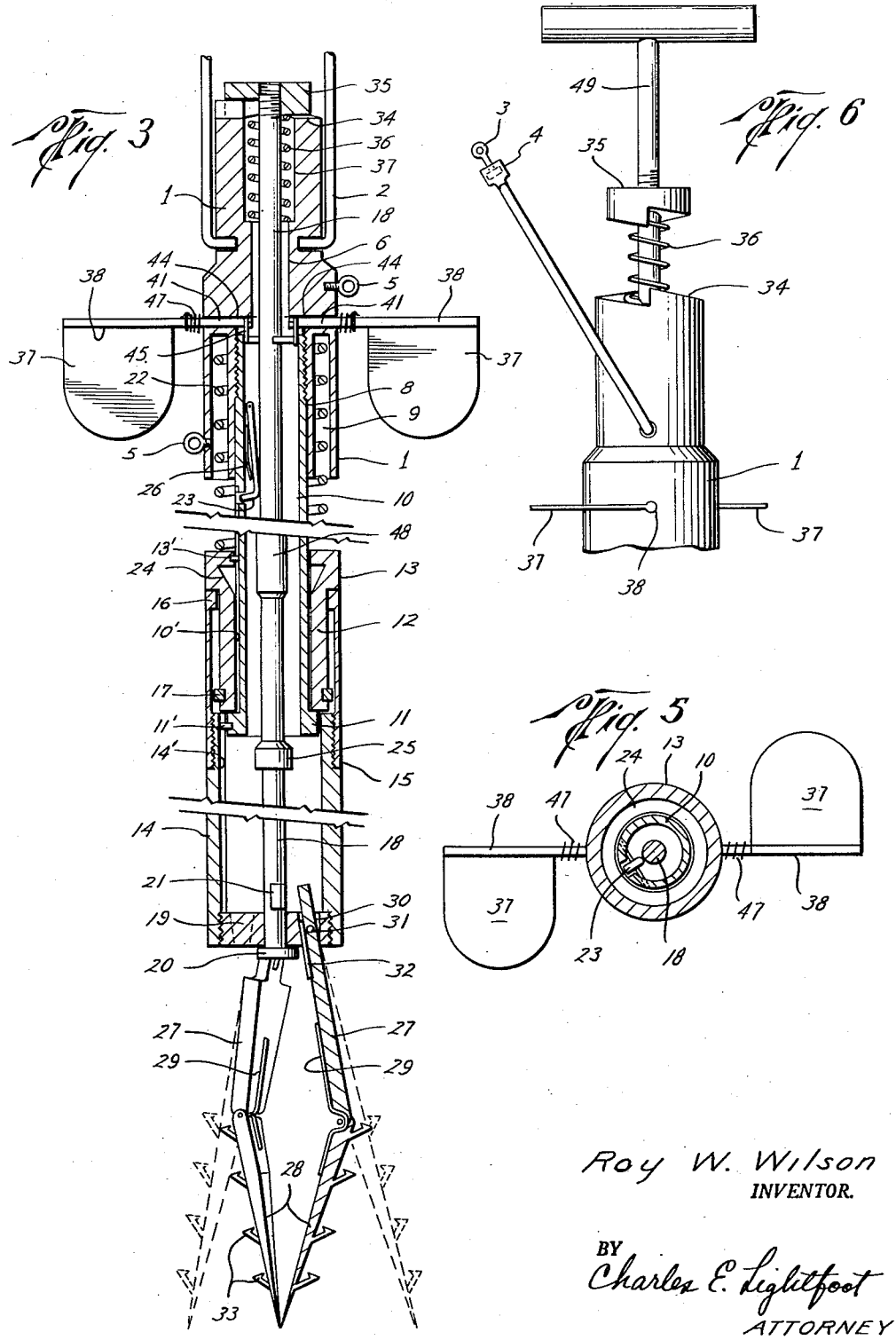

United States Patent Office 2,811,803
Patented Nov. 5, 1957

2,811,803

FISH SNARE

Roy W. Wilson, Houston, Tex.

Application September 19, 1955, Serial No. 535,040

4 Claims. (Cl. 43—36)

This invention relates to a fish snare, and it concerns more particularly a snare which is intended to be attached to a fishing line in the same manner that a hook ordinarily is attached thereto, and which performs the usual function of a hook but does it more effectively.

It is an object of the invention to provide a snare of the type described having expansible bait carrying means for engagement by the fish, and having spring actuated means, releasable upon contact of the fish with the bait carrying means, capable of abruptly thrusting the bait carrying means into the gullet of the fish while at the same time expanding the bait carrying means.

This invention will be readily understood by referring to the following description and the accompanying drawings, in which:

Figure 1 is a sectional elevational view of a fish snare embodying the invention, showing the snare in its fully retracted and latched position;

Figure 2 is a fragmentary view similar to Figure 1, showing the snare in an intermediate position in which it is unlatched and partially expanded;

Figure 3 is a view similar to Figure 1, showing the snare in its fully expanded position;

Figure 4 is a sectional plan view taken along the line 4—4 of Figure 1 and looking in the direction indicated by the arrows;

Figure 5 is a sectional plan view taken along the line 5—5 of Figure 2 and looking in the direction indicated by the arrows;

Figure 6 is a fragmentary side view taken at right angles to the views shown in Figures 1 to 3 and illustrating the method of setting the snare in its fully retracted and latched position;

Figure 7 is an exploded view, on an enlarged scale, showing in detail certain features of the snare as illustrated in Figures 1 to 3.

Figure 8 is a fragmentary view, on an enlarged scale, showing an optional arrangement which may be incorporated in the snare if desired.

Referring to the drawing, the snare of the invention includes a tubular body 1, as hereinafter described, which is normally disposed vertically and has a bail 2 connected thereto intermediate its ends. An eye 3 is connected by a swivel 4 to the bail 2, whereby the snare may be attached to a fishing line or the like. A pair of eyes 5 are attached to the body 1 below the bail 2 for use in attaching a float and a weight, respectively, to the body 1. The eyes 5 are spaced apart from each other and are positioned on opposite sides of the body 1.

A central bore 6 is formed in the body 1. The bore 6 is of a restricted diameter intermediate its ends, and has internally enlarged portions numbered 7 and 8, respectively, adjacent its upper and lower ends. An annular cavity 9 is formed in the lower end of the body 1, between the peripheral surface of the body 1 and the enlarged portion 8 of the bore 6.

A sleeve 10, which has an outside diameter corresponding to the inside diameter of the enlarged portion 8 of the bore 6, is threadably connected at one end to the enlarged portion 8 and extends downwardly below the body 1. The sleeve 10 is enlarged externally at 11, adjacent its lower end. A sleeve 12, which has an inside diameter corresponding to the outside diameter of the sleeve 10, surrounds the sleeve 10 and is capable of a limited longitudinal movement with respect thereto. The sleeve 12 is positioned below the lower end of the body 1, and is enlarged externally at 13, adjacent its upper end, which is keyed to the sleeve 10, as by means of a key 13' carried by the enlargement 13 and which is slidably extended through an exterior longitudinal groove 10' in the sleeve 10. The enlarged portion 13 has an outside diameter corresponding to that of the body 1.

A sleeve 14, which has an inside diameter corresponding to the outside diameter of the enlarged lower end 11 of the sleeve 10 and an outside diameter corresponding to that of the body 1, surrounds the sleeve 10 and is capable of a limited longitudinal movement with respect thereto. The sleeve 14 is keyed to the enlarged lower end 11 of the sleeve 10, as by means of a key 11' carried by the enlargement 11 which is slidably extended into an interior longitudinal groove 14' in the sleeve 14, and extends downwardly below it. The sleeve 14 is positioned below the lower end of the sleeve 12.

The upper end of the sleeve 14 is of reduced outside diameter, and is threadably connected to the lower end of a sleeve 15, which has an outside diameter corresponding to that of the body 1 and an inside diameter larger than the outside diameter of the portion of the sleeve 12 below the enlarged portion 13. The sleeve 15 is positioned below the enlarged portion 13, and surrounds the sleeve 12 and is capable of a limited longitudinal movement with respect thereto. The sleeve 15 is enlarged internally at 16, adjacent its upper end, for engagement with a snap ring 17 positioned in an annular groove provided therefor in the peripheral surface of the sleeve 12 adjacent its lower end.

An elongated shaft 18 is disposed within the bore 6 of the body 1, and extends upwardly above the body 1 and downwardly through the sleeves 10 and 14. The lower end of the shaft 18 is journaled in a bushing 19, which is positioned in the lower end of the sleeve 14 and is threadably connected thereto. An enlarged portion 20 of the shaft 18 engages the under side of the bushing 19, and three circumferentially spaced lugs 21, which extend radially outwardly from the shaft 18, engage the upper side of the bushing 19, so that the bushing 19, the sleeve 14 and the sleeve 15 are movable longitudinally with the shaft 18. Likewise the sleeve 12, which is capable of a limited longitudinal movement with respect to the sleeve 15, is movable longitudinally with the shaft 18 as hereinafter described.

A compression spring 22, which is received in the annular cavity 9, is capable of acting upon the body 1 and the sleeve 12 whereby the sleeve 12 is moved downwardly until the enlarged upper end 13 of the sleeve 12 abuts the enlarged upper end 16 of the sleeve 15, after which the sleeve 15, the sleeve 14 and the shaft 18 are moved downwardly with the sleeve 12. As shown in Figure 1, the sleeve 12 is restrained from moving downwardly in response to the action of the spring 22 by a latch 23.

The latch 23 consists of an elongated member which is bent at right angles intermediate its ends, and which is positioned in a longitudinal slot provided therefor in the wall of the sleeve 10. The latch 23 is pivotally connected at its upper end to the sleeve 10, and its lower end extends radially outwardly for engagement with an annular groove 24 which is formed in the inner wall of the sleeve 12 adjacent its enlarged upper end 13 whereby the sleeve 12 is latched in its uppermost position, in which it abuts the lower end of the body 1. The shaft 18 has an enlargement 25 intermediate its ends which has a beveled upper edge adapted to engage the latch 23 whereby the latch 23 is retained in engagement with the groove 24. A leaf spring 26 (see Fig. 3) is capable of acting upon the sleeve 10 and the latch 23 to urge the latch 23 out of engagement with the groove 24 when not acted upon by the enlargement 25.

Three articulated spikes, each of which has an upper joint 27 and a lower joint 28, are pivotally connected at their upper ends to the bushing 19 and extend downwardly therefrom. The spikes are each continuously tapered to a point adjacent the lower end of the lower joint 28, and are widened adjacent the upper end of the upper joint 27. The joints 27 and 28 are pivotally connected to each other, and are acted upon by a leaf spring 29 applied to one edge of each of the connected joints whereby the spikes are yieldably bowed outwardly intermediate their ends. The spikes are arranged in a circle with their pointed lower ends facing inwardly and touching each other.

The upper ends of the upper joints 27 are received in circumferentially spaced arcuate slots 30 provided therefor in the bushing 19, and are pivotally connected as at 31 to the walls of the slots 30. The upper joints 27 extend upwardly above the slots 30 for engagement with the lugs 21 whereby the portions of the spikes above the pivots 31 are inclined radially outwardly and the portions below the pivots 31 are inclined radially inwardly and the spikes, which are normally bowed intermediate their ends, are each arranged in a substantially straight line. Leaf springs 32 are capable of acting upon the inner walls of the slots 30 and the adjacent sides of the upper joints 27, below the pivots 31, to urge the lower ends of the upper joints 27 radially outwardly, so that the spikes each assume a bowed position, upon rotation of the shaft 18 so that the lugs 21 are disengaged from the upper ends of the upper joints 27.

A plurality of barbs 33 are spaced longitudinally with respect to the lower joints 28 of the spikes and extend radially outwardly therefrom, for use in attaching suitable bait to the spikes. The arrangement is such that when a fish strikes the bait the spikes are pulled downwardly, carrying the bushing 19 and the shaft 18 downwardly with them, so that the enlarged portion 25 of the shaft 18 disengages the latch 23. The latch 23 is then acted upon by the leaf spring 26 so that it is disengaged from the annular groove 24 of the sleeve 12, and the sleeve 12 is urged downwardly by the action of the compression spring 22. The enlarged upper end 13 of the sleeve 12 engages the enlarged upper end 16 of the sleeve 15 whereby the sleeve 15, the sleeve 14, the bushing 19 and the shaft 18 are moved abruptly downwardly by the action of the compression spring 22 on the sleeve 12.

The upper end of the body 1 has a cam-like surface 34 for engagement with the under side of an enlarged portion 35 of the shaft 18, which serves as a cam follower. The enlarged portion 35 is positioned adjacent the upper end of the shaft 18. A compression spring 36 is received in the enlarged portion 7 of the bore 6, and surrounds the shaft 18. The spring 36 acts upon the body 1 and the under side of the enlarged portion 35 to urge the shaft 18 upwardly, whereby the enlarged portion 35 is yieldably disengaged from the cam-like surface 34, the enlarged upper end 16 of the sleeve 15 yieldably engages the enlarged upper end 13 of the sleeve 12, the enlarged upper end 13 of the sleeve 12 yieldably engages the lower nd of the body 1, and the enlarged portion 25 of the shaft 18 yieldably engages the latch 23. The spring 36 is relatively weak as compared to the spring 22, so that the upward thrust of the spring 36 is overcome by the downward thrust of the spring 22 when the latch 23 is released as above described.

When a fish strikes the bait and the shaft 18 is pulled downwardly as above described, the latch 23 is disengaged and the spring 22 exerts a downward thrust whereby the shaft 18 is positively moved downwardly until the cam follower 35 engages the cam 34, which causes the shaft 18 to be rotated about its axis whereby the lugs 21 are disengaged from the upper ends of the articulated spikes, causing the spikes to assume a bowed position as shown in Figure 3.

A pair of flippers, each of which consists of a planar member 37 having a shaft 38 rigidly connected to one edge thereof, the axis of the shaft 38 being aligned longitudinally with the connected edge of the planar member 37, are pivotally connected to the body 1 as hereinafter described and extend radially outwardly on opposite sides thereof.

As shown in Figure 7 each of the shafts 38 has an externally splined end portion 39 for engagement with an internally splined socket 40 which is formed in one end of a shaft 41, whereby the shaft 38 may be adjustably positioned circumferentially with respect to the shaft 41. A clip 42 is attached to the shaft 38 for engagement with an external enlargement 43 formed on the adjacent end of the shaft 41 whereby the shaft 38 may be retained in engagement with the shaft 41. The shafts 41 are rotatably positioned in transverse openings 44 provided therefor in opposite sides of the body 1.

A crank arm 45 is removably connected to the end of each of the shafts 41 opposite the socket 40 and turns with it. The crank arm 45 extends outwardly at right angles to the shaft 41, and has a pin 46 connected to its outer end. The pin 46 is disposed parallel to the shaft 41, and a spring 47, which is coiled about the shaft 41 and is connected at one end to the shaft 41 and at its other end to the body 1, acts upon the body 1 and the shaft 41 whereby the pin 46 is yieldably maintained in engagement with the shaft 18.

The shaft 18 is enlarged at 48, above the enlarged portion 25, to form a cam-like surface for engagement with the pins 46, which slidably engage opposite sides of the shaft 18 and serve as cam followers. The enlarged portion 48 has beveled upper and lower edges, and upon movement of the shaft 18 longitudinally in either direction the pins 46 engage the enlarged portion 48 whereby the shafts 41 are turned by the crank arms 45. This causes the flippers to be swung outwardly and upwardly in opposite directions.

The shaft 18 is moved downwardly by the action of the spring 22, when released as above described, so that the flippers are swung outwardly and upwardly at the same time that the shaft 18, which also carries the articulated spikes, is thrust downwardly. Thus the flippers tend to maintain the body 1 substantially stationary in the water as the shaft 18 is thrust downwardly, whereby the spikes are abruptly shoved down the gullet of the fish and at the same time expanded therein. As the shaft 18 approaches its lowermost position the enlarged portion 48 clears the pins 46, and the flippers are swung downwardly substantially parallel to the body 1, so that the snare, with the fish attached thereto, may be readily lifted from the water. The flippers are adjustably positioned on the shafts 41, as above described, so that the snare may be caused to spin at any desired rate when pulled through the water.

As shown in Figure 6, the snare may be set in its fully retracted and latched position, illustrated in Figure 1, by threadably connecting a setting tool 49 to the enlarged portion 35 and lifting the shaft 18 with respect to the body 1, while at the same time rotating the shaft 18 so that the lugs 21 engage the upper ends of the articulated spikes, which during this operation may be held manually in the position shown in Figure 1.

Figure 8 shows an optional arrangement in which the lower end of the shaft 18 is threaded, and a nut 50, which corresponds to the enlargement 20 shown in Figures 1 to 3, is applied thereto. Openings 51 are spaced circumferentially about the nut 50, for engagement by a wrench, and a lock nut 52 is applied to the shaft 18 below the nut 50. This arrangement permits the effective length of the shaft 18 to be adjusted more precisely, and tends to make the snare more sensitive and more effective, particularly for use in catching small fish.

The invention may be modified in various ways without departing from the spirit and scope thereof.

Having thus clearly shown and described the invention, what is claimed as new and desired to secure by Letters Patent is:

1. A fish snare comprising a tubular body having means for attachment thereof to a fishing line, the body being disposed vertically and having a central bore formed therein, an elongated shaft disposed within the bore of the body and extending beyond the ends thereof, the shaft being capable of a limited longitudinal movement with respect to the body, the shaft having an enlarged portion adjacent its upper end, spring means acting upon the body and the enlarged portion of the shaft to urge the shaft upwardly with respect to the body, a first sleeve surrounding the shaft and connected at one end to the body and extending downwardly therefrom, a bushing rotatably connected to the lower end of the shaft and extending radially outwardly therefrom below the first sleeve, a second sleeve surrounding the first sleeve and connected at its lower end to the bushing, a third sleeve surrounding the first sleeve and positioned between the body and the second sleeve, the second and third sleeves each being keyed to the first sleeve and being capable of a limited longitudinal movement with respect thereto, a fourth sleeve connected at its lower end to the second sleeve and extending upwardly therefrom, the upper end of the fourth sleeve surrounding the lower end of the third sleeve and being capable of a limited longitudinal movement with respect thereto, the third sleeve having an externally enlarged upper end for engagement with the lower end of the body and the upper end of the fourth sleeve, the fourth sleeve having an internally enlarged upper end for engagement with a snap ring positioned in an annular groove adjacent the lower end of the third sleeve, spring means acting upon the body and the third sleeve to urge means acting upon the body and the third sleeve to urge the shaft downwardly with respect to the body and the first sleeve, the last mentioned spring means being stronger than the first mentioned spring means and being capable of overcoming the upward thrust thereof, latch means capable of restraining the third sleeve from being moved downwardly in response to the action of said last mentioned spring means and releasable upon downward movement of the shaft relative to the body to permit such downward movement of said third sleeve, and barbed bait carrying means connected to the bushing and extending downwardly therefrom and movable downwardly with said bushing and shaft upon release of said latch means.

2. A fish snare comprising a tubular body having means for attachment thereof to a fishing line, the body being disposed vertically and having a central bore formed therein, an elongated shaft disposed within the bore of the body and extending beyond the ends thereof, the shaft being capable of a limited longitudinal movement with respect to the body, the upper end of the body having a cam-like surface and the shaft having an enlarged portion adjacent its upper end for engagement with the cam-like surface whereby the shaft is capable of being rotated about its axis upon being moved downwardly with respect to the body, spring means acting upon the body and the enlarged portion of the shaft to urge the shaft upwardly with respect to the body, a first sleeve surrounding the shaft and connected at one end to the body and extending downwardly therefrom, a bushing rotatably connected to the lower end of the shaft and extending radially outwardly therefrom below the first sleeve, the shaft having an enlarged portion adjacent its lower end engaging the under side of the bushing and a plurality of circumferentially spaced lugs extending radially outwardly therefrom and engaging the upper side of the bushing, a second sleeve surrounding the first sleeve and connected at its lower end to the bushing, a third sleeve surrounding the first sleeve and positioned between the body and the second sleeve, the second and third sleeves each being keyed to the first sleeve and being capable of a limited longitudinal movement with respect thereto, a fourth sleeve connected at its lower end to the second sleeve and extending upwardly therefrom, the upper end of the fourth sleeve surrounding the lower end of the third sleeve, the third sleeve having an externally enlarged upper end for engagement with the lower end of the body and the upper end of the fourth sleeve, the fourth sleeve having an internally enlarged upper end for engagement with a snap ring positioned in an annular groove adjacent the lower end of the third sleeve, spring means acting upon the body and the third sleeve to urge the third sleeve, the fourth sleeve, the second sleeve, the bushing and the shaft downwardly with respect to the body and the first sleeve, the last mentioned spring means being stronger than the first mentioned spring means and being capable of overcoming the upward thrust thereof, a latch comprising an angular member positioned in a longitudinal slot formed in the first sleeve, one end of the latch being pivotally connected to the walls of the slot and the other end thereof being adapted to engage an annular groove formed in the inner wall of the third sleeve adjacent its upper end whereby the third sleeve is restrained from being moved downwardly in response to the action of the spring means, spring means acting upon the first sleeve and the latch to urge the latch out of engagement with the annular groove of the third sleeve, the shaft having an enlarged portion intermediate its ends capable of acting upon the latch when in its uppermost position to maintain it in engagement with the annular groove, and spring actuated, expansible, bait carrying means connected to the bushing and extending downwardly therefrom, the bait carrying means being capable of being latched in a retracted position by engagement thereof with the lugs and being releasable upon rotation of the shaft whereby the lugs are disengaged therefrom.

3. In a fish snare as described in claim 2, wherein the bait carrying means comprises a plurality of articulated spikes, each having an upper joint and a lower joint, pivotally connected at their upper ends to the bushing and extending downwardly therefrom, the spikes being continuously tapered to a point adjacent the lower end of the lower joint and being widened adjacent the upper end of the upper joint, the joints being pivotally connected to each other and a leaf spring being applied to one edge of each of the connected joints whereby the spikes are yieldably bowed outwardly intermediate their ends, the spikes being arranged in a circle with their pointed lower ends facing inwardly and touching each other, the upper ends of the upper joints being received in circumferentially spaced arcuate slots provided therefor in the bushing and being pivotally connected to the walls of the slots, the upper joints extending upwardly above the slots for engagement with the lugs whereby the portions of the spikes above the pivots may be inclined radially outwardly and the portions below the pivots may be inclined radially inwardly so that the spikes each may be arranged in a substantially straight line, spring means acting upon the inner walls of the slots and the adjacent sides of the upper joints, below the pivots, to urge the lower ends of the upper joints radially outwardly, so that the spikes each assume a bowed position, upon rotation of the shaft so that the lugs are disengaged from the upper ends of the upper joints.

4. In a fish snare as described in claim 2, a pair of flippers pivotally connected to the body and extending radially outwardly on opposite sides thereof, the flippers each consisting of a planar member, a shaft rigidly connected to and whose axis is disposed in parallel relation to one edge of the planar member, each of the shafts comprising a circumferentially adjustable extension of a second shaft, the last mentioned shafts being rotatably positioned in transverse openings provided therefor in opposite sides of the body, each of the last mentioned shafts having a crank arm connected to one end thereof and arranged to turn with it, the crank arms each having a pin connected to its outer end for engagement with the longitudinally movable shaft, spring means acting upon the body and the flipper shafts to yieldably maintain the pins in engagement with the longitudinally movable shaft and the longitudinally movable shaft having an enlargement intermediate its ends for engagement with the pins whereby the flippers are swung outwardly and upwardly.

References Cited in the file of this patent

UNITED STATES PATENTS

| | | |
|---|---|---|
| 2,041,634 | Boyko | May 19, 1936 |
| 2,189,496 | Maurer | Feb. 6, 1940 |
| 2,544,782 | Fawcett | Mar. 13, 1951 |